(12) United States Patent
Hildrum et al.

(10) Patent No.: US 7,844,634 B2
(45) Date of Patent: Nov. 30, 2010

(54) FOCUSED COMMUNITY DISCOVERY IN NETWORK

(75) Inventors: Kirsten Weale Hildrum, Hawthorne, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 11/283,383

(22) Filed: Nov. 18, 2005

(65) Prior Publication Data
US 2007/0118539 A1  May 24, 2007

(51) Int. Cl.
*G06F 7/00* (2006.01)
*G06F 17/30* (2006.01)
(52) U.S. Cl. .......................... 707/798; 706/20
(58) Field of Classification Search .................. 707/100
See application file for complete search history.

(56) References Cited

U.S. PATENT DOCUMENTS

| 6,421,668 | B1 * | 7/2002 | Yakhini et al. ................. 707/6 |
| 2002/0091655 | A1 * | 7/2002 | Agrafiotis et al. ............. 706/26 |
| 2003/0093432 | A1 * | 5/2003 | Fujita et al. ................. 707/100 |
| 2004/0181554 | A1 * | 9/2004 | Heckerman et al. ...... 707/104.1 |
| 2005/0038533 | A1 * | 2/2005 | Farrell et al. .................. 700/73 |
| 2006/0053136 | A1 * | 3/2006 | Ashiri ......................... 707/101 |

OTHER PUBLICATIONS

WO 02/084431 A2, Gordin et al. (PCT International Publication), Oct. 24, 2002.*
W. Aiello et al., "Analysis of Communities of Interest in Data Networks," Proceedings of PAM,14 pages, 2005.
C. Cortes et al., "Communities of Interest," Proceedings IDA, 10 pages, 2001.
G.W. Flake et al., "Efficient Identification of Communities," Sixth ACM SIGKDD International Conference on Knowledge Discovery and Data Mining, pp. 150-160, Aug. 2000.
G.W. Flake et al., "Graph Clustering and Minimum Cut Trees," Journal of Internet Mathematics, vol. 1, No. 4, pp. 385-408, 2003.
H. Ino et al., "Partitioning of Web Graphs by Community Topology," WWW 2005, Proceedings of the 14th International Conference on World Wide Web, pp. 661-669, 2005.

* cited by examiner

*Primary Examiner*—Charles Rones
*Assistant Examiner*—Kris Mackes
(74) *Attorney, Agent, or Firm*—Kenneth R. Corsello; Ryan, Mason & Lewis, LLP (57) ABSTRACT

Techniques for community discovery in a network are disclosed. For example, a technique for discovering a community around a given entity in an interaction graph, wherein nodes in the graph represent entities and edges connecting nodes in the graph represent interactions between connected nodes, comprises the following steps/operations. Nodes in the interaction graph are partitioned into different sets of nodes based on interaction information associated with each node to minimize a number of interaction pairs that need to be considered. An objective function is minimized by moving entities between the different sets such that the community is discovered once a measure associated with the objective function is minimized.

18 Claims, 7 Drawing Sheets

FIND-COMMUNITY (R)
1.     core ← R
2.     changed ← true
3.     while changed
4.     do
5.         changed ← false
6.         fringe ← neighbors (core)
7.         for each $v$ in core
8.         do
9.             if $obj$ (core - $\{v\}$) < $obj$ (core)
10.                 then
11.                     core ← core - $\{v\}$
12.                     changed ← true
13.
14.         for each $v$ in fringe
15.         do
16.             if $obj$ (core ∪ $\{v\}$) < $obj$ (core)
17.                 then
18.                     core ← core ∪ $\{v\}$
19.                     changed ← true
20.
21.     return core

FIG. 4

FIND - COMMUNITY - IMPROVED ($R$)
1.    core $\leftarrow$ $R$
2.    *change* $\leftarrow$ *true*
3.    while *changed*
4.      do
5.        *change* $\leftarrow$ *false*
6.        fringe $\leftarrow$ neighbors (core)
7.        for each $v$ in core
8.          do
9.            *change* $(v)$ $\leftarrow$ *obj* (core) $-$ *obj*(core $-$ $\{v\}$)
10.
11.        for each $v$ in fringe
12.          do
13.            *change* $(v)$ $\leftarrow$ *obj*(core) $-$ *obj*(core $\cup$ $\{v\}$)
14.
15.        for each $v$ in core $\cup$ fringe
16.          do
17.            if *change*$(v)$ $> 0$ and *change*$(v)$ in top
                and $c(v, \text{core}) > |\text{core}|/10$
18.              then move $(v)$
19.                 *changed* $\leftarrow$ *true*
20.
21.    return core

FOCUSED COMMUNITY DISCOVERY IN NETWORK

This invention was made with Government support under Contract No.: H98230-04-3-0001 awarded by the U.S. Department of Defense. The Government has certain rights in this invention.

FIELD OF THE INVENTION

This present invention generally relates to community discovery techniques and, more particularly, to techniques for focused community discovery in a network.

BACKGROUND OF THE INVENTION

Networks, such as social networks, can often be described by an interaction graph. An interaction graph comprises nodes and edges between nodes, wherein nodes represent entities and edges represent interactions between entities. For example, interactions may include entities coauthoring a paper, sharing a phone call, or exchanging an email.

Given such a graph and an entity of interest in that graph, a goal is to find the natural grouping or community around that entity. A "community" is a group of entities that interact more with each other than with the rest of the users. This notion tries to capture the way information flows in social networks. Notice that even if two entities in a community are not directly connected, if there are enough paths between them, information spreads from one to the other rather quickly.

It is desirable that a community search exhibit the following characteristics:

(i) Focused. In many cases, such as tracking a crime group, it is the community around a particular individual or set of individuals that matters. Traditional approaches, rather than focusing on a specific individual, work on the entire graph. On a graph consisting of millions of users, this is unnecessary work.

(ii) Scalable. Algorithm for focused community search should work in a scenario with millions or tens of millions of entities.

(iii) Robust. It is realized that data used to create an interaction graph is imperfect. Some links will be false positives, representing interactions that have nothing to do with the community of interest. Second, some links representing relationships may not be present. This could be simply because some data is unobserved (e.g., not all papers are in the scientific literature digital library known as CiteSeer), or it could be because of the community structure (e.g., criminals hiding their interaction by dealing via a third party).

Unfortunately, existing approaches are unable to satisfy all three conditions.

One problem in a community search task is identifying communities. Informally, a community is a group of entities that belong together. Real-life communities are formed by people working together, sharing a hobby, living nearby each other, etc. Making this intuition mathematical is difficult.

The simplest approach to community discovery around a starting point R is to return all nodes with direct links to R. This is the approach taken by Cortes et al., "Communities of Interest," *Proceedings IDA2001*, 2001, and in Aiello et al., "Analysis of Communities of Interest in Data Networks," *Proceedings of PAM*, 2005. While scalable and focused, these approaches are not robust. First, some neighbors of R result from essentially random interactions, and do not reflect any sort of community at all. More seriously, much of the community might not be a direct neighbor of R. Consider a graduate student in the data mining community who reviews papers, attends conferences, and so on. If the graduate student has only direct links in a citation graph to his or her advisor and fellow graduate students, then the student will not show up as part of the community. A neighbors-only search starting at any researcher other than the advisor leaves the student out.

A natural extension of this approach is to look at entities within a certain distance of the start entity. This is called a distance-based community discovery approach. While this increases the number of relevant entities found, it also increases the number of irrelevant entities found, thus increasing the recall at the cost of reduced precision. Furthermore, because social network graphs tend to have a small diameter, doing this sort of expanding ring search is likely to be quite expensive.

Accordingly, there is a need for community discovery techniques which overcome the above drawbacks, as well as other drawbacks, associated with existing community discovery approaches.

SUMMARY OF THE INVENTION

Principles of the invention provide techniques for community discovery in a network that overcome the above drawbacks, as well as other drawbacks, associated with existing community discovery approaches.

For example, in one aspect of the invention, a technique for discovering a community around a given entity in an interaction graph, wherein nodes in the graph represent entities and edges connecting nodes in the graph represent interactions between connected nodes, comprises the following steps/operations. Nodes in the interaction graph are partitioned into different sets of nodes based on interaction information associated with each node to minimize a number of interaction pairs that need to be considered. An objective function is minimized by moving entities between the different sets such that the community is discovered once a measure associated with the objective function is minimized.

The different sets of nodes may comprise a fringe set and a core set. The objective function minimizing step/operation may further comprise: for each node in the core set, determining if moving the node out of the core set reduces the objective function measure; and for each node in the fringe set, determining whether moving the node into the core set reduces the objective function measure. Further, the objective function minimizing step/operation may further comprise moving one or more nodes between the sets when the objective function measure is reduced. The moving step/operation may be performed for a given percentage of potential node movements. The moving step/operation may comprise moving a node from the fringe set into the core set when the node is connected to a given number of nodes inside the core set. Still further, each node in the core set may connect to at least a fraction of the other nodes in the core set.

The objective function may comprise an expansion measure, a degree measure, or a weight measure. Data in the interaction graph may represent a stream of interaction pairs and the community to be discovered is in response to a continual query on an entity of interest. Further, the technique may comprise determining a member score for each member of at least one of the sets and scores for closely-related non-members of the at least one set.

Advantageously, principles of the invention permit community discovery in very large networks. In contrast with previous approaches, the focused approach of the invention allows the searcher to specify start points of interest, and find the community of those points. Such a focused search allows for a much more scalable algorithm in which processing time depends on the size of the community, and not on the number of nodes in the graph, and so is scalable to arbitrarily large graphs. Furthermore, the discovery is robust to imperfect data, such as extra or missing edges in the graph.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary data processing system architecture, and may refer to a network such as a social network. It should be understood, however, that the invention is not limited to use with any particular system architecture or any particular type of network. The invention is instead more generally applicable to any data processing system and any network in which it would be desirable to discover patterns of interaction among a set of entities in streaming and non-streaming environments.

As used herein the phrase "data stream" may generally refer to a continuous sequence of data over a given time period. By way of example, such a sequence of data may be generated by a real-time process which uses continuous data storage. For example, the data stream could result from businesses which electronically interact with one another, co-authors in a dynamic bibliography database, or hyperlinks from web pages. In each of these cases, the interaction among different entities can rapidly evolve over time. However, it is to be understood that principles of the invention are not limited to any particular type of data stream and, as mentioned above, are not limited to streaming environments.

Also, it is to be appreciated that the phrase "interaction pair" is generally defined as a pair of interacting entities (i.e., represented as a pair of nodes in an interaction graph).

Before describing illustrative principles of the invention, we illustrate some drawbacks of the distance-based community discovery approach, described above, that served to motivate community discovery techniques of the invention.

Figure 1:
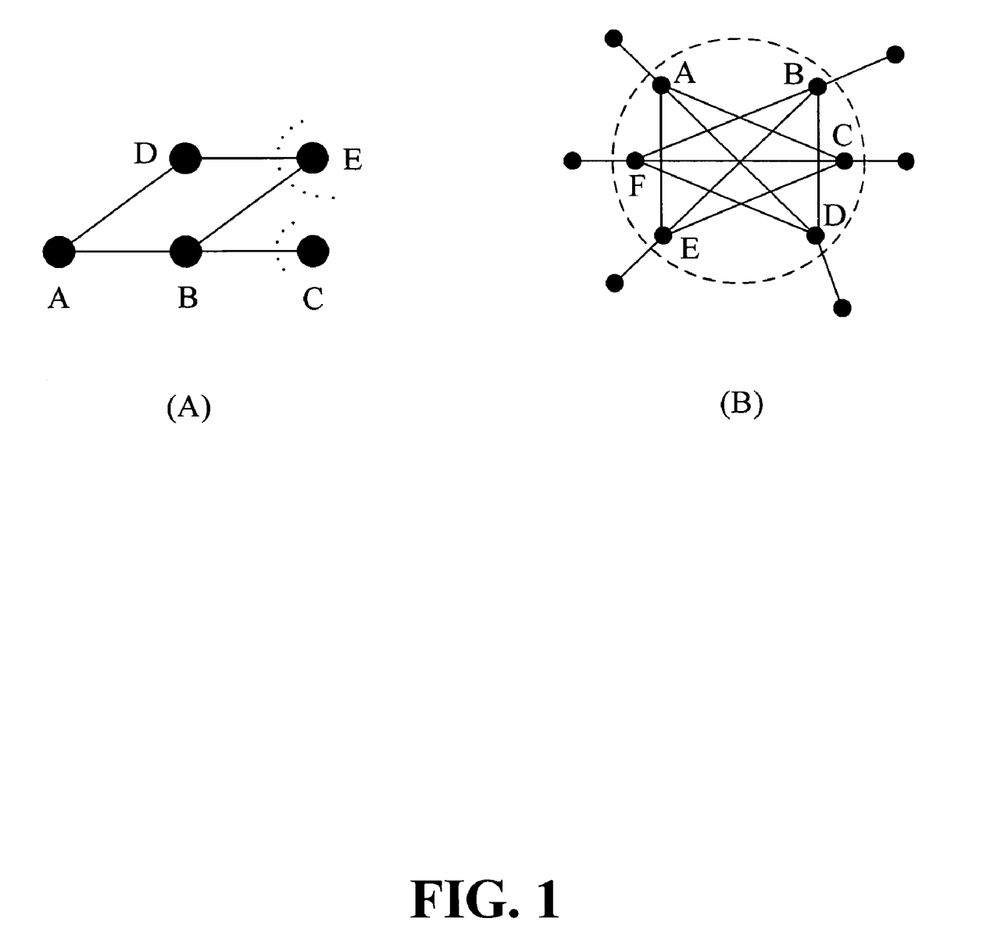
FIGS. 1A and 1B illustrate drawbacks of distance-based community discovery approaches.

FIG. 1A illustrates flaws with a distance-based approach. Intuitively, assume that entity E belongs in the community with entity A, even though there is no direct link, while entity C does not. However, a distance-based clustering would treat E and C the same, i.e., since E and C are both two links away from A, they both would be included in a community around A.

Such a flaw in the distance-based approach is one motivation for a cut-based approach according to principles of the invention. In a cut-based approach, principles of the invention use "cuts" as a measure of closeness. Cuts are generally defined as sets of edges separating one part of the graph from another. By way of example, to separate A and E, at least two edges must be cut (the edge between E and D and the edge between E and B), while to separate A from C, only one edge needs to be cut (the edge between C and B). Thus, using a cut metric, E is considered "closer" to A, since there are more paths (and thus more interactions) between E and A, than between C and A.

Further, consider now a method of the discovery that draws a "circle" around the starting point R that cuts as few edges as possible, relative to the size of the circle drawn. As shown in FIG. 1B, a circle is drawn such that only one edge is cut for each of nodes A through F (note the nodes being cut out of the community are not labeled). Let $c(S, V \backslash S)$ be the number of edges leaving set S wherein S is A, B, C, D, E and F. V is the set of vertices in the graph. Thus, $V \backslash S$ is the set of vertices in the graph that are not in S. For FIG. 1B, $S = \{A, B, C, D, E, F\}$, while $V \backslash S$ could be an arbitrarily large set of vertices not pictured. FIG. 1B shows why we do not use just $c(S, V \backslash S)$ alone. In that case, though the six nodes (A through F) form a clear community, the best cut is one that cuts one individual node (A, B, C, D, E or F) off from the rest.

Thus, $c(S, V \backslash S)$ can be normalized. Yet, we also want to ensure that everything inside the circle is "well-connected" to R. More formally, given a graph G and a relevant set R, the task is to find a set S such that $R \subseteq S$, nodes in S are well-connected to R, and $c(S, V \backslash S)/g(S)$ (where g(S) is a suitable normalizing function) is minimal. Various normalizing functions may be used, as will be illustratively described below.

Accordingly, illustrative principles of the invention provide a cut-based algorithm for focused community search as follows. The cut-based approach devises an objective function and introduces a "fringe" concept as a way to limit the number of nodes that need to be examined so that the algorithm can work in an incremental, greedy fashion. Such a cut-based approach can also be used for streaming graphs (i.e., data streams), as will be explained.

As a result of this inventive approach, the running time of the technique depends on the community size, and not the overall set size. When applied to synthetic data, the returned communities are very close to the planted communities. In tests on real data, the results are robust, and return interesting communities. In a real graph consisting of millions of entities, the running time is typically seconds.

Community Identification

Given a set R of one or more start points specified by a user, a goal of the algorithm of the invention is to find a core set S containing those one or more start points. This set should be tightly connected. This means the number of edges leaving the core should be relatively small. Recall that $c(S, V \backslash S)$ denotes the number of edges leaving S. Recall that FIG. 1B showed that minimizing $c(S, V \backslash S)$ would be heavily biased toward small sets. Principles of the invention normalize based on the fact that a larger set will tend to have more edges leaving the set by minimizing $c(S, V \backslash S)/g(S)$ rather than $c(S, V \backslash S)$.

We consider three normalizing factors:

Expansion. In this case, the objective is to minimize c(S, V\S)/|S|, where |S| denotes the number of elements (nodes) in S.

Degree. Here, the objective is to minimize c(S, V\S)/vol(S), where vol(S) denotes the total degree of all entities in S. Degree represents how many edges a node has to other nodes.

Weight. Here, the objective function c(S, V\S)/w(S), where w(S) denotes the total weight of edges within S.

Note that the definitions of the above normalizing factors depend on set S being smaller than V\S (recall that V\S is the set of vertices in the graph that are not in S).

Figure 2:
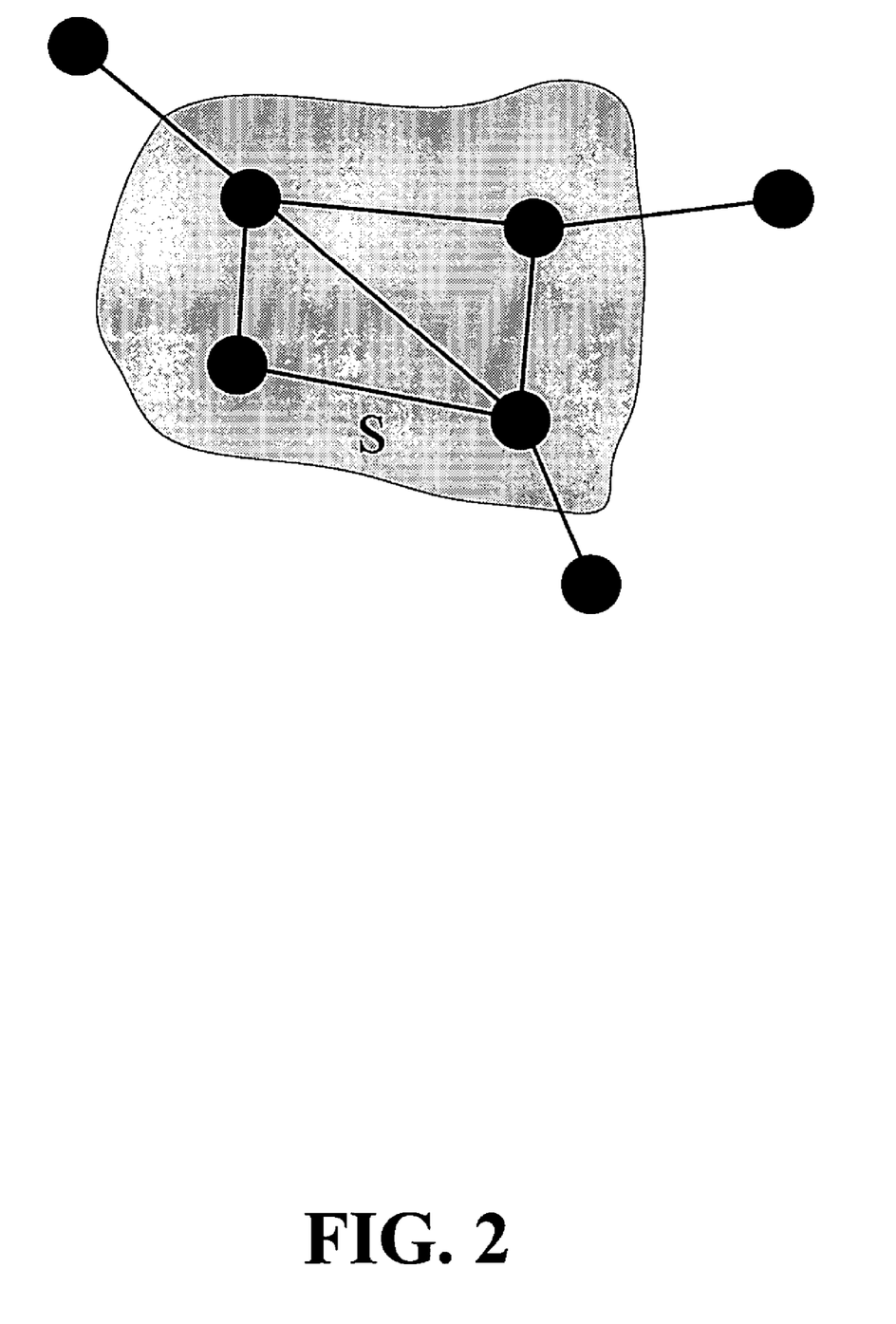
FIG. 2 illustrates differences between various objective functions, according to an embodiment of the present invention.

FIG. 2 illustrates the difference between these objectives. More particularly, FIG. 2 illustrates that the expansion measure is 3/4, the degree measure is 3/13, and the weight measure is 3/5. These measures are derived as follows.

For the expansion, c(S, V\S)=3. For this case, g(S)=|S| (or the number of nodes in S), and is 4. Therefore, c(S, V\S)/|S|=3/4.

For degree, c(S, V\S)=3. For this case, g(S)=sum of degrees of nodes in S, which is 4 for top left (tl) node, 3 for top right (tr) node, 2 for bottom left (bl) node, and 4 for bottom right (br) node. Thus, the sum is 13. So, the objective value is 3/13.

For weight, c(S, V\S)=3. For this case, g(S)=sum of edges in S. In this case, it is 5 edges (tl to tr, tl to bl, tl to br, tr to br, bl to br). Thus, the objective value is 3/5.

However, not only do we want a core that is well-separated from the rest of the nodes, we also want the core to be nodes that are well-connected to R. Ensuring that this is the case requires that we add an additional condition to our community, namely that each node in the core must connect to at least some fraction of the other nodes in the core.

Figure 3:
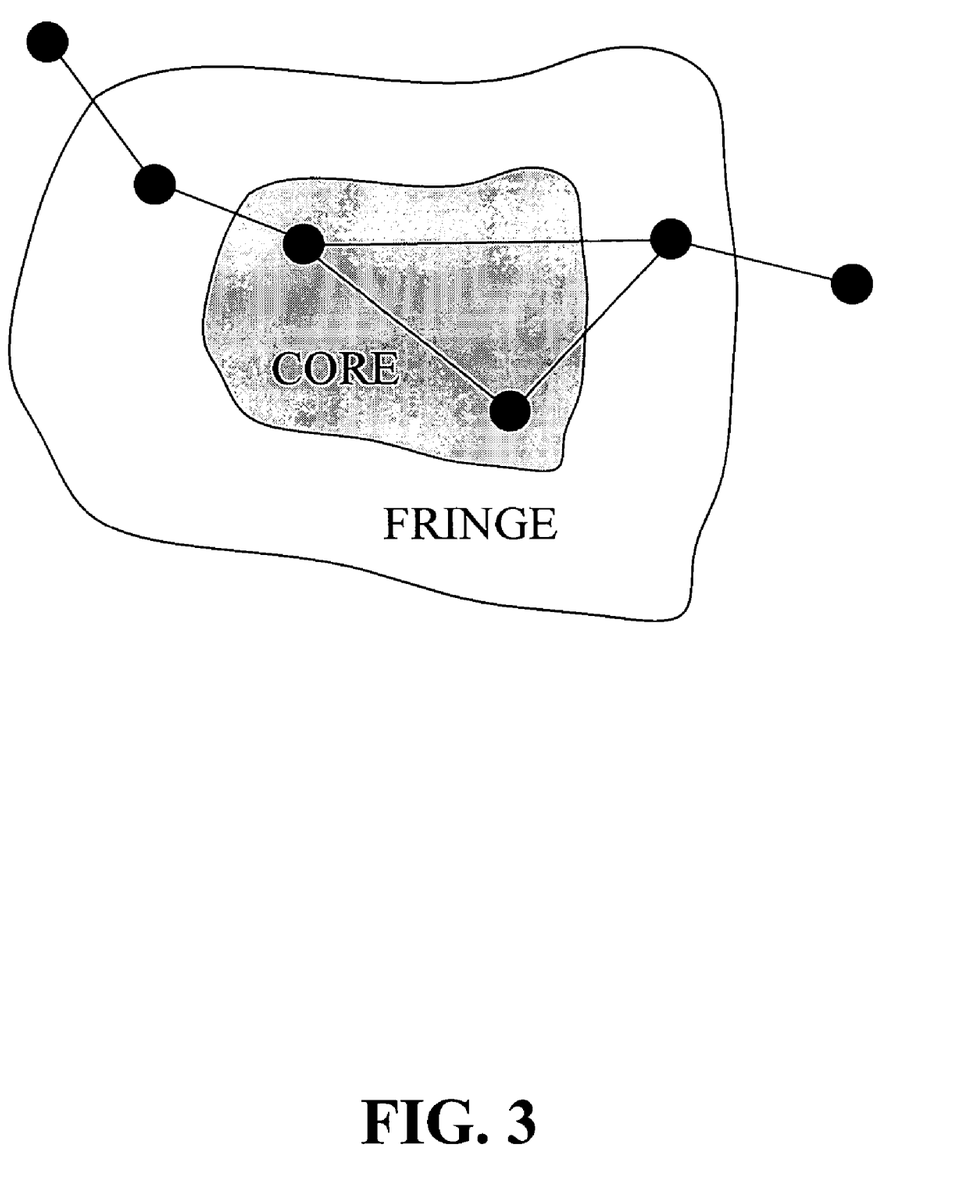
FIG. 3 illustrates a core/fringe concept of community discovery, according to an embodiment of the present invention.

The cut-based algorithm of the invention greedily optimizes one of the three above objectives. FIG. 3 shows the concept behind the algorithm. The algorithm maintains a core set. The "core" set is the algorithms current best guess as to the community. Then the "fringe" set is the set of nodes that are directly connected to core nodes but that are not in the core set. Thus, as an initial step, nodes in the interaction graph are partitioned into different sets (i.e., a core set and a fringe set) of nodes based on interaction information associated with each node such that the number of interaction pairs that need to be considered is minimized. Preferably, this is accomplished by considering the core set to be the set of one or more nodes specified by the user as the start point.

At each step, for every node in the core, the algorithm determines if moving the node out of the core set reduces the objective. If so, it makes the move. Likewise, for each node in the fringe set, it determines whether moving into the core set lowers the objective. If it does, it moves it. This process is repeated, evaluating all the nodes in core and fringe until no change occurs or a cycle is detected. Illustrative code for this algorithm is shown in FIG. 4.

However, commonly, the vertices in R would be ejected in line 10, with the result that the returned set did not include the start set. This could be addressed by forcing the core to always contain R, but the algorithm then returns a core that is S'∪R where the set S' was unconnected to R. Since a goal is to find a community around R, the results were not always the best results.

Figure 4:
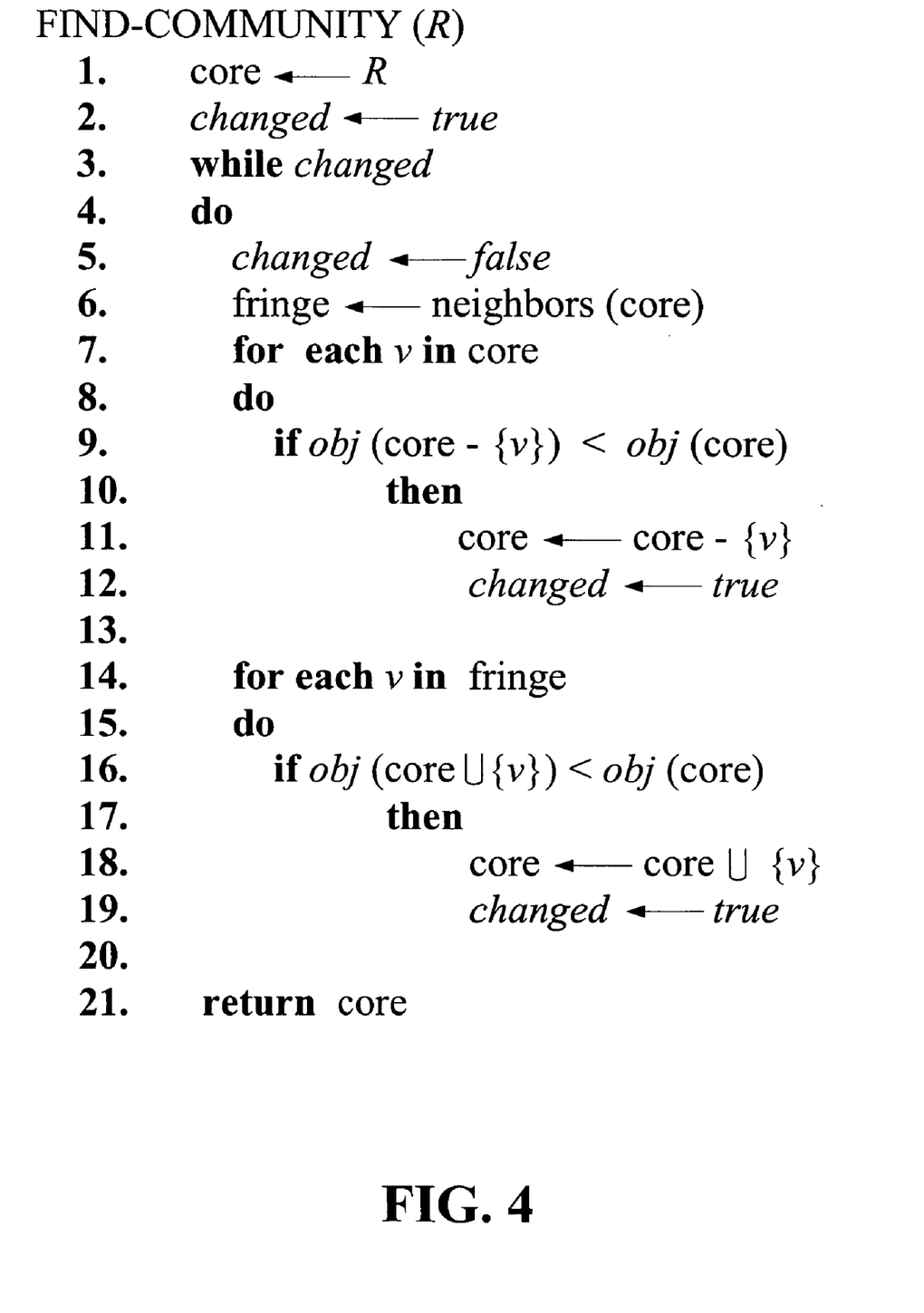
FIG. 4 illustrates a community discovery methodology, according to an embodiment of the present invention.

Examination of the progress of the algorithm of FIG. 4 shows why there is sometimes a strong drift away from R. When the core set is small and contains only R, a node with a tenuous connection to R can enter the core, and then pull in nodes with a weight force equal to R's, having a substantial impact on which other nodes enter. The result is a good core according to the objective function, but not a core containing R. Because of this sensitivity to the early nodes, the ordering of the vertices substantially influences the end set.

Figure 5:
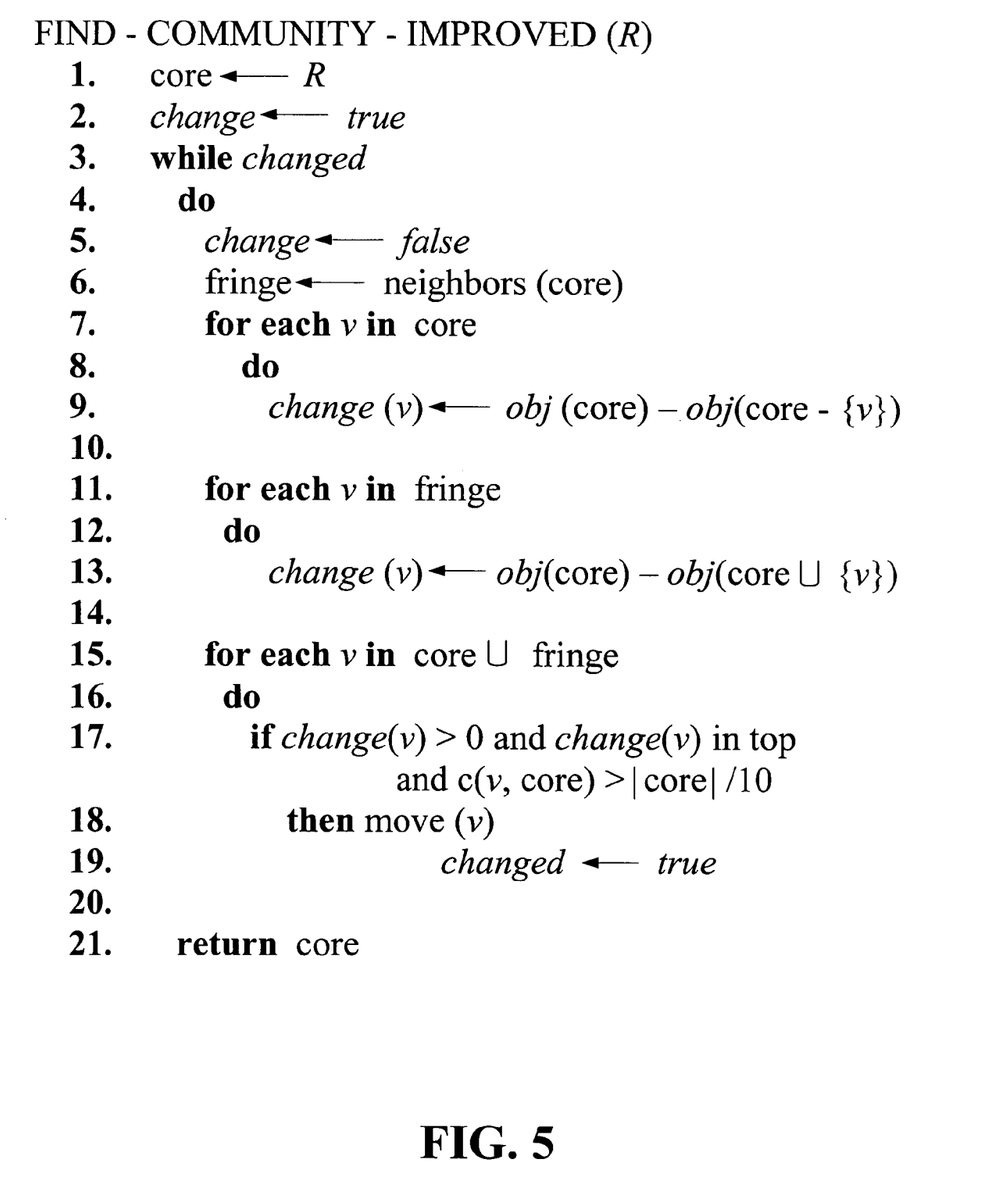
FIG. 5 illustrates a community discovery methodology, according to another embodiment of the present invention.

To deal with this, we made two changes that increase the influence of R over the final core set. We considered imposing distance constraints, but that would have introduced the problems mentioned above in the Background section. Instead, we slowed down the algorithm. Rather than allowing all changes, in each run through the nodes in the core and the fringe, the algorithm now first calculates the value of each change, and then makes only a few of the top-valued changes (more specifically, in one embodiment, only 10% of the changes). Second, in order to move a node in, we also now require that the node be connected to some minimal number of nodes inside the core. We chose 10% in one embodiment. Illustrative code for the alternative algorithm is shown in FIG. 5.

Accordingly, the algorithm minimizes the particular objective function by moving entities between the different sets such that the community is discovered once the measure associated with the objective function is minimized.

Generalization

This algorithm naturally generalizes to a streaming setting. In this scenario, edges (u,v) arrive one at a time in a stream. The algorithm must either store the edge, or discard it. A natural example is email messages or phone calls. In this setting, for each node v in the core and each node u in the fringe, two counters are maintained. The internal counter counts edges between v and nodes in the core, while the external counter counts edges between v and nodes outside of the core. These two counters are all that is needed to determine the change in objective when moving v into or out of the core. Let $v_{int}$ be the internal counter, and $v_{ext}$ be the external counter. Then, c(S, V\S) (the numerator for all objectives) is $\Sigma_{v \in S} v_{ext}$. The expansion, |S| is $\Sigma_{v \in S} v_{ext}$, the degree objective is vol(S)=$\Sigma_{v \in S} v_{ext}+v_{int}$), and the weight w(S)=vol(S)=$\Sigma_{v \in S} v_{ext}+v_{int}$. The counters for a node u in the fringe are needed to calculate obj(S∪{u}) in line 12 (FIG. 5)

If memory is extremely limited, we only need to keep these two counters. To expire old data, consider an epoch-based scheme and an exponential decay-based scheme.

In an epoch-based system, after a certain total number of edges have arrived, the algorithm does one run through the while loop in FIG. 5 and then resets all counters. The danger is that if the epochs are too short, then nodes with infrequent edges that belong in the community will see no connection to the community, and so may be rejected. If the epochs are too long, the algorithm is not responsive to changes in data.

An alternative is to use exponentially decaying counters. However, in this case, the counters can become inaccurate. Consider a node v in either the core or the fringe. Suppose some of the weight of its external counter is due to connections to a node u in the fringe. If u is then moved into the core, the weight in $v_{ext}$ due to (u,v) edges should now be weight in $v_{int}$. However, since we do not know anything about the weight of the (u,v) edges, we cannot do that.

A more memory-intensive, but potentially more accurate option, is for each node in the core and the fringe to keep all the edges from the last k time units. Thus, u keeps all its neighbors for the last k units of time. An advantage of this approach is that the internal to external count is more accurate.

In contrast to the above case, since u keeps a list of the edges, it is able to change the counters when v's status changes.

Also, the algorithm presented here naturally generalizes to weighted graphs.

Furthermore, it is to be appreciated that each of the above-described objective functions (expansion measure, degree measure and weight measure) also provides a way to rank the importance of members inside the community, and a way to rank the importance of members near the community. For a member x, the rank inside the community would be obj(S\x)−obj(S). The more strongly x belongs in the community, the higher this score. For a node x outside the community, obj(S)−obj(S∪{x}) measures how close x is to the community. The smaller this number, the closer x is to the community. Note that here, obj(S)=cut(S,V\S)/g(S), where g(S) is one of the normalizing functions.

Figure 6:
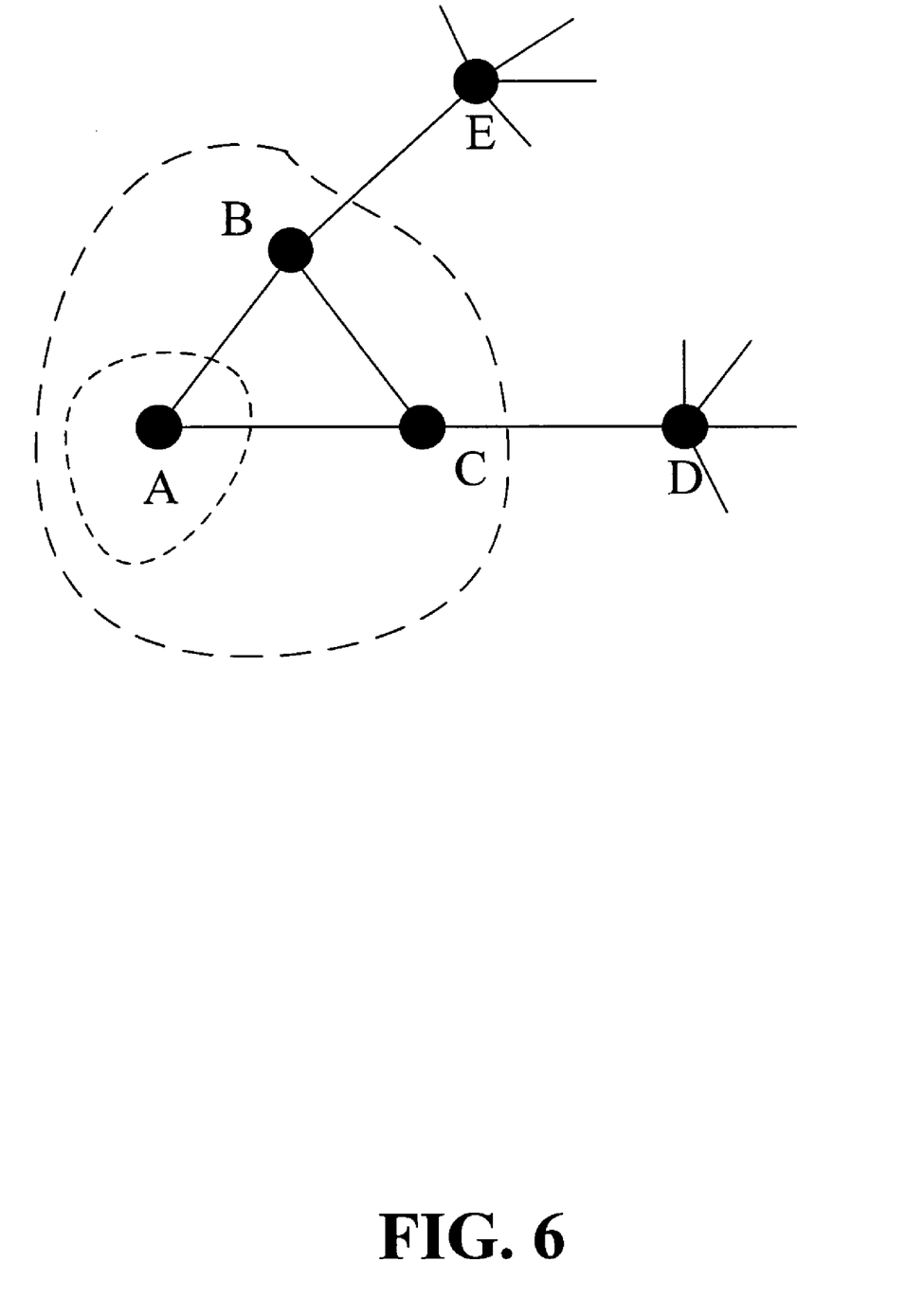
FIG. 6 illustrates an example of the execution of the community discovery methodology of FIG. 5.

FIG. 6 illustrates an example of the execution of the community discovery methodology of FIG. 5. It is to be understood that in this simple example, all three objective functions would produce the same result, though this is not necessarily true in general.

The focus point (denoted as R in the pseudo code of FIG. 5) is node A. It is assumed that the user selected A as the desired start point.

First, the core set is considered to be A (the dotted line), and the fringe set includes A's neighbors B and C (the dashed line). At this point, the objective values are 2, 2/2, and ∞ (infinity) for expansion, degree, and weight, respectively.

The objective value on moving B (change(B) as calculated in line 13 of FIG. 5) would be 3/2, 3/5, and 3 for expansion, degree, and weight, respectively. The change(C) values are the same.

As a result, since both change(B) and change(C) are positive, in line 18 of FIG. 5, both B and C would be moved into the core set. The objective functions are now 2/3, 2/8, and 2/3, respectively, and the fringe set now includes E and D.

Moving either E or D into the core would change the objective function to 4/4, 4/13, and 4/4, respectively, and thus, neither of these moves would happen, and the algorithm would terminate with a core community of A, B, and C, and a fringe of E and D.

Note that there could be many other nodes connected to D and E, either directly or indirectly. However, advantageously, the community discovery technique of the invention provides that, while searching for a community around A, interaction pairs involving nodes that are far from A do not have to be considered.

Figure 7:
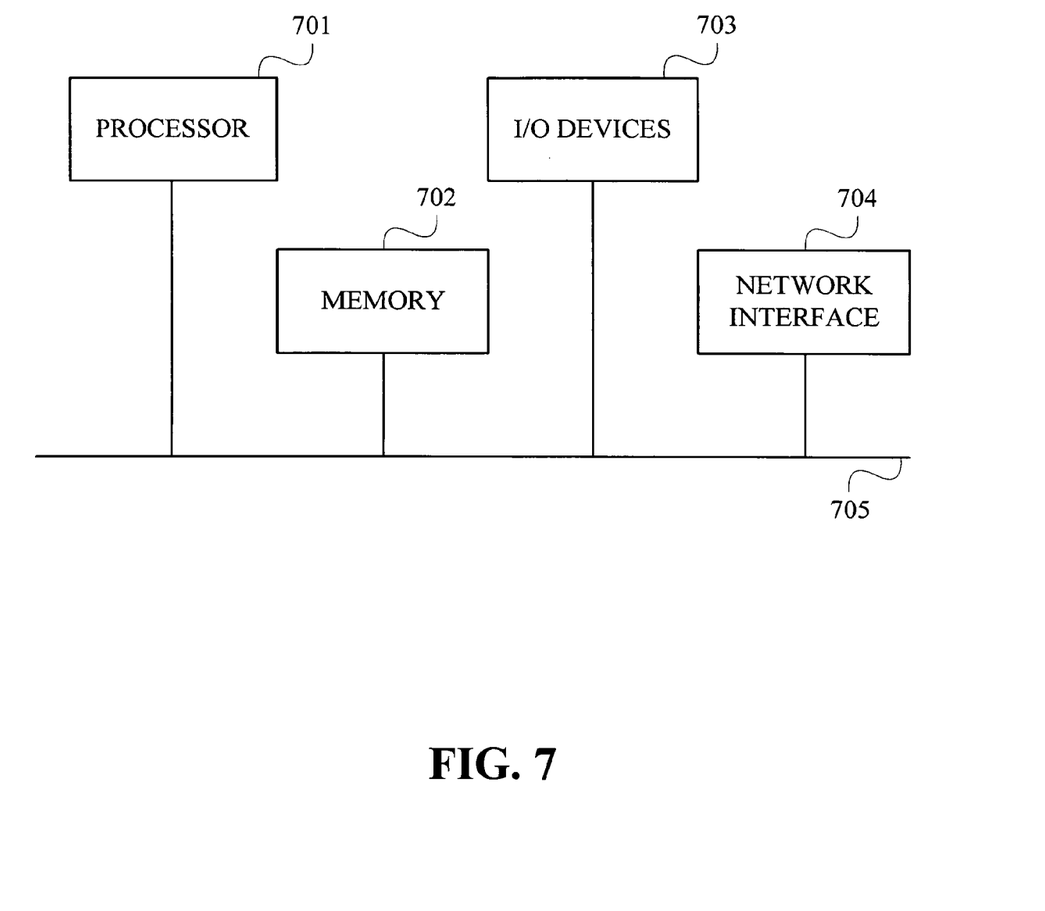
FIG. 7 illustrates a computing system in accordance with which one or more components/steps of a community discovery system may be implemented, according to an embodiment of the present invention.

FIG. 7 illustrates a computing system in accordance with which one or more components/steps of the community discovery techniques (e.g., components and methodologies described in the context of FIGS. 1 through 6) may be implemented, according to an embodiment of the present invention. It is to be understood that the individual components/steps may be implemented on one such computing system or on more than one such computing system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computing system shown in FIG. 7 may represent one or more servers or one or more other processing devices capable of providing all or portions of the functions described herein.

As shown, the computing system architecture may comprise a processor 701, a memory 702, I/O devices 703, and a network interface 704, coupled via a computer bus 705 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for discovering a community around a given entity in an interaction graph, wherein nodes in the graph represent entities and edges connecting nodes in the graph represent interactions between connected nodes, the method comprising:

partitioning nodes in the interaction graph into different sets of nodes based on interaction information associated with each node to minimize a number of interaction pairs that need to be considered, wherein the different sets comprise at least one of a first set and a second set wherein nodes in the first set are candidates for the community being identified and nodes in the second set are nodes connected to one or more nodes in the first set but are not in the first set;

minimizing an objective function based at least in part on a number of edges leaving at least one of the different sets of nodes, wherein the objective function minimizing step comprises determining whether or not to move one or more nodes between the first and second sets based on whether or not a given move minimizes a measure associated with the objective function; and identifying the nodes in the first set as the community around the given entity in the interaction graph when the objective function is minimized;

wherein each step of the method is performed by one or more computing systems.

2. The method of claim 1, wherein the moving step is performed for a given percentage of potential node movements.

3. The method of claim 1, wherein the moving step comprises moving a node from the second set into the first set when the node is connected to a given number of nodes inside the first set.

4. The method of claim 1, wherein each node in the first set connects to at least a fraction of the other nodes in the first set.

5. The method of claim 1, wherein the objective function comprises an expansion measure.

6. The method of claim 1, wherein the objective function comprises a degree measure.

7. The method of claim 1, wherein the objective function comprises a weight measure.

8. The method of claim 1, wherein data in the interaction graph represents a stream of interaction pairs and the community to be discovered is in response to a continual query on an entity of interest.

9. The method of claim 1, further comprising the step of determining a member score for each member of at least one of the sets and scores for closely-related non-members of the at least one set.

10. The method of claim 1, wherein a value of a move between the first and second sets is computed before making the move, and the given move is made or not made based on the computed value.

11. The method of claim 1, wherein the objective function is based at least in part on a number of edges connecting a node in the first set and a node in the second set.

12. Apparatus for discovering a community around a given entity in an interaction graph, wherein nodes in the graph represent entities and edges connecting nodes in the graph represent interactions between connected nodes, the apparatus comprising:

a memory; and at least one processor coupled to the memory and configured to:

(i) partition nodes in the interaction graph into different sets of nodes based on interaction information associated with each node to minimize a number of interaction pairs that need to be considered, wherein the different sets comprise at least one of a first set and a second set wherein nodes in the first set are candidates for the community being identified and nodes in the second set are nodes connected to one or more nodes in the first set but are not in the first set;

(ii) minimize an objective function based at least in part on a number of edges leaving at least one of the different sets of nodes, wherein the object function minimizing operation comprises determining whether or not to move one or more nodes between the first and second sets based on whether or not a given move minimizes a measure associated with the objective function; and (iii) identify the nodes in the first set as the community around the given entity in the interaction graph when the objective function is minimized.

13. The apparatus of claim 12, wherein the objective function comprises one of an expansion measure, a degree measure, and a weight measure.

14. The apparatus of claim 12, wherein data in the interaction graph represents a stream of interaction pairs and the community to be discovered is in response to a continual query on an entity of interest.

15. The apparatus of claim 12, wherein the at least one processor is further operative to determine a member score for each member of at least one of the sets and scores for closely-related non-members of the at least one set.

16. The apparatus of claim 12, wherein the objective function is based at least in part on a number of edges connecting a node in the first set and a node in the second set.

17. An article of manufacture for discovering a community around a given entity in an interaction graph, wherein nodes in the graph represent entities and edges connecting nodes in the graph represent interactions between connected nodes, the article comprising a computer readable storage medium containing one or more programs which when executed by a computer implement the steps of:

partitioning nodes in the interaction graph into different sets of nodes based on interaction information associated with each node to minimize a number of interaction pairs that need to be considered, wherein the different sets comprise at least one of a first set and a second set wherein nodes in the first set are candidates for the community being identified and nodes in the second set are nodes connected to one or more nodes in the first set but are not in the first set;

minimizing an objective function based at least in part on a number of edges leaving at least one of the different sets of nodes, wherein the objective function minimizing step comprises determining whether or not to move one or more nodes between the first and second sets based on whether or not a given move minimizes a measure associated with the objective function; and identifying the nodes in the first set as the community around the given entity in the interaction graph when the objective function is minimized.

18. The article of manufacture of claim 17, wherein the objective function is based at least in part on a number of edges connecting a node in the first set and a node in the second set.

* * * * *